United States Patent [19]
Kakitani et al.

[11] Patent Number: 5,999,772
[45] Date of Patent: Dec. 7, 1999

[54] IMAGE FORMING APPARATUS WITH SUPPORT MEMBER

[75] Inventors: Youtaro Kakitani, Yokohama; Kentaro Matsumoto, Ichikawa; Hiroyuki Nagashima, Yokohama; Kiyonori Tsuda, Machida, all of Japan; Yong-Seog Lee, Seoul, Rep. of Korea

[73] Assignee: Ricoh Company, Ltd., Tokyo, Japan

[21] Appl. No.: 09/148,980

[22] Filed: Sep. 8, 1998

[30] Foreign Application Priority Data

Sep. 8, 1997 [JP] Japan .................................. 9-242366

[51] Int. Cl.⁶ ........................ G03G 21/00; G03G 21/16
[52] U.S. Cl. ............................................ 399/125; 347/138
[58] Field of Search ............................ 399/125, 107, 399/110, 111; 347/138, 152; 267/113, 118

[56] References Cited

U.S. PATENT DOCUMENTS 4,673,956 6/1987 Kobayashi .............................. 347/138
4,754,293 6/1988 Aizawa et al. .......................... 347/138
5,206,681 4/1993 Otomo et al. ........................ 399/125 X
5,737,667 4/1998 Okuda et al. ....................... 399/107 X

FOREIGN PATENT DOCUMENTS 59-084260  5/1984  Japan .
9-090693  4/1997  Japan .

Primary Examiner—Sandra Brase
Assistant Examiner—Sophia S. Chen
Attorney, Agent, or Firm—Oblon, Spivak, McClelland, Maier & Neustadt, P.C.

[57] ABSTRACT

An image forming apparatus includes a single support member, an upper body and a lower body. The single support member is positioned between the upper body and lower body and connected at a back lower portion of the lower body. The cumulative weight of the upper body is aligned, to a significant degree, over the location where the support member pushes against the upper body. As a consequence the upper body is conveniently moved away from the lower body when opened, and the gap between the upper body and lower body is free of obstructions so as to facility an operator's ability to perform a maintenance action.

12 Claims, 3 Drawing Sheets

IMAGE FORMING APPARATUS WITH SUPPORT MEMBER

BACKGROUND OF THE INVENTION

Field of the Invention

The present invention pertains to image forming apparatuses that include support members. More particularly, the present invention relates to image forming apparatuses such as copiers, printers, facsimile machines, and the like that have at least two main body components that are interconnected by a support member when the two main body components are separated, such as perhaps during maintenance operations.

Discussion of the Background

Conventional image forming apparatuses have a main body that is divided into an upper part and a lower part. The upper part includes subcomponents that cooperate to obtain an image data that will subsequently be printed on a paper or another image holding member. The lower part includes subcomponents that cooperate to take the image data and form a toner image on the paper. A paper feed path is formed between the upper part and the lower part. In this way, if maintenance action is required, such as to remove a paper jam, or insert a toner cartridge or the like, a latch mechanism is activated by an operator, which allows the upper part and lower part to separate from one another. Once the upper part and lower part are separated, the maintenance action may be performed. Then the two parts may be brought together once again and the image forming apparatus is brought on-line for making other images.

In order to facilitate the separation of the upper part and lower part when the operator actuates the latch mechanism, conventional image forming apparatuses include springs, that help urge the separation of the two parts. As presently recognized, it is difficult to identify a spring that has the proper amount of elasticity so that the upper part and lower part separate from one another easily, but without too much force. For example, if each spring has too much resiliency, the upper part rapidly moves away from the lower part when opened, giving rise to the possibility that the mass and velocity of the upper part will cause the unit to shake and mechanically stress its components. Furthermore, an operator may have a difficult time overcoming the resiliency force, when closing the opened upper part. On the other hand, if the resiliency force of each spring is too weak, the operator must exert more force than necessary in order to open the upper part when performing a maintenance action. Consequently, the choice of the material of the spring is relevant from a user operability perspective. Furthermore, due to aging concerns of the material used for the spring, the resiliency force of the spring will vary with time, thereby changing the operability characteristics of the spring over the life cycle of the printing apparatus. Another problem is that the springs do not control the motion of the upper part during the entire time the upper part is moving away from, or toward, the lower part. Consequently, an operator may inadvertently lose control of the upper part when opening the upper part and damage the apparatus.

Another issue is the extent to which the upper part separates from the lower part, thus creating sufficient room to perform a maintenance action. Often, opening the upper part during a maintenance action, and separating the same from the lower part, permits an operator to perform a maintenance action only if there is sufficient room in which the operator to work. Thus, the use of the spring, the length of the spring and the material for the spring, all bear on this issue about how wide the separation gap is between the upper part and the lower part when the upper part is separated from the lower part during a maintenance action.

Other conventional devices include two dampers, instead of the springs, for allowing for easy and controlled opening of the apparatus. In these configurations, the cooperation of both dampers is essential so as to provide proper weight distribution and balance, and opening/shutting power for the device. In this configuration, one of the two dampers is placed at a front of the image forming apparatus, while the other is placed at the back side of the image forming apparatus, in this way the weight of the components in the upper part is shared between the dampers. However, as presently recognized, when using two dampers, the access to the separation gap between the upper part and the lower part is hindered by the dampers. Moreover, the maintenance space becomes narrow and small and thus it is difficult for an operator to remove a paper jam or perform another type of maintenance action. Furthermore, conventional wisdom is such that the symmetry of the two dampers is essential in order to maintain a proper weight balance of the machine. Furthermore, in modem image forming apparatuses, small inexpensive devices are desirable, and thus, as presently recognized, using two dampers at least requires additional cost and space in order to physically accommodate both dampers.

SUMMARY OF THE INVENTION

The present invention has been made in view of the above-identified problems, and accordingly, an object of the present invention is to provide an image forming apparatus that overcomes the above-identified problems, as well as other problems. To this end, a feature of the image forming apparatus according to the present invention, is a device that includes a single support member, positioned to allow for an upper part of the image forming apparatus to be opened and moved away from the lower part with minimal force on the part of the operator, while maintaining adequate space between the upper part and lower part, during a maintenance action. Weight distribution in the upper part is controlled so as to avoid stressing the upper part when closing the upper part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
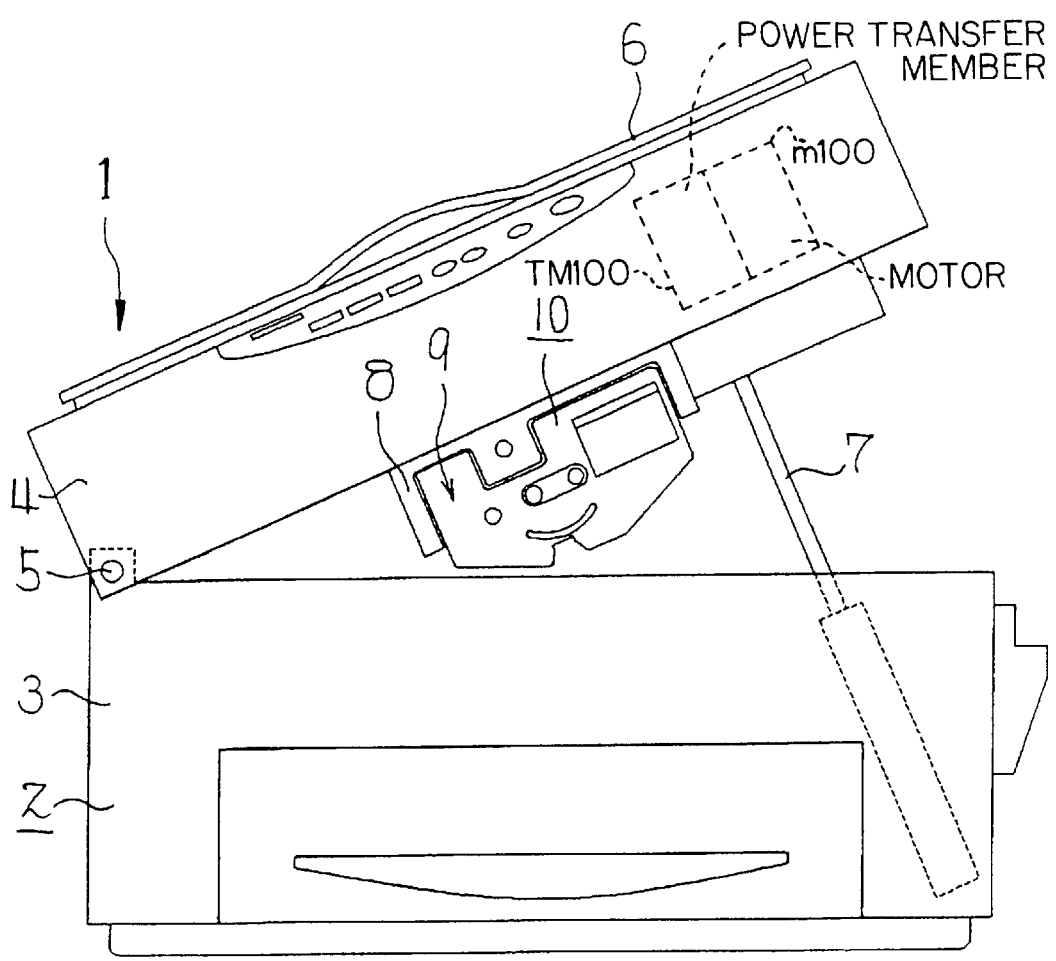
FIG. 1 is a front elevation of an image forming apparatus, in an open state, according to the present invention.

Referring now to the drawings, wherein like reference numerals designate identical or corresponding parts throughout the several views. FIG. 1 is a front elevation of an image forming apparatus, a copier in the present embodiment, but also may be other image forming apparatuses such as printers, facsimile machines and the like. The copier 1 includes a main body 2, where the main body has two separate parts: an upper part (upper body) 4 and a lower part (lower body) 3. The upper body 4 is rotatably connected to the lower body 3 by way of a fulcrum 5, and thus, when opened, the upper body 4 rotates about an upper edge of the lower body 3, thereby granting access to the gap between the upper body 4 and the lower body 3. The upper body 4 has a clamp (not shown) formed at an edge thereof, for clamping to the lower body, when the upper body 4 is in a closed position. The clamp may be a latch (mechanical, magnetic or otherwise) that holds the upper body 4 to the lower body 3.

The upper body 4 includes a scanner unit, key pad, and document platen, each used in support of a scanning operation. Other features of the image forming apparatus are described in "infotec, Copier 5081/5081Z, Operating Instructions," infotc part number: 889-899-41, pages 6–7, 14–17, 34–35, 42–51, and 60–61, available in the United Kingdom from Danke House, the contents of which being incorporated herein by reference. The scanner unit is included within the upper body 4, and the upper body 4 has a pressure board 6 attached thereto for pressing a document to be scanned toward a contact glass disposed over the top surface of the upper body 4. As shown in FIG. 1, the upper body 4 is pivotally connected to the lower body 3 by the fulcrum 5. In addition, a gas damper 7 (sometimes referred to as a damper) also interconnects the upper body 4 with the lower body. The piston-action of gas damper 7 controls the speed of movement of the upper part 4 during the entire opening motion of the upper part. The position of the gas damper 7 is such that one end of the gas damper connects to a rear wall of the lower body 3, and the other end connect to the upper body 4. The gas damper 7 connects on its upper end to a location closer to the fulcrum 5 than the connecting point of a lower end thereof to the lower body 3. In this way, when the upper body 4 is opened, the arm of the gas damper 7 extends away from the lower body 3, albeit at a controlled rate of speed, due to the gas dampening action. Similarly, when the upper body 4 is closed against the lower body 3, the gas damper 7 acts to limit a speed at which the upper body 4 is closed against the lower body 3. Consequently, the gas damper 7 is extended when the upper body 4 is open, and contracted when the upper body 4 is closed, such as after a maintenance action has been completed.

As seen in FIG. 1, the image forming apparatus includes an image developing magazine 10, which is one part of an image forming unit 9 that fits in a side frame housing 8 as shown. The image developing magazine 10 is removable, and also placed in a center position of the upper part 4, so that sufficient clearance is available to remove the image developing magazine 10 when the gas damper 7 is fully extended.

Figure 2:
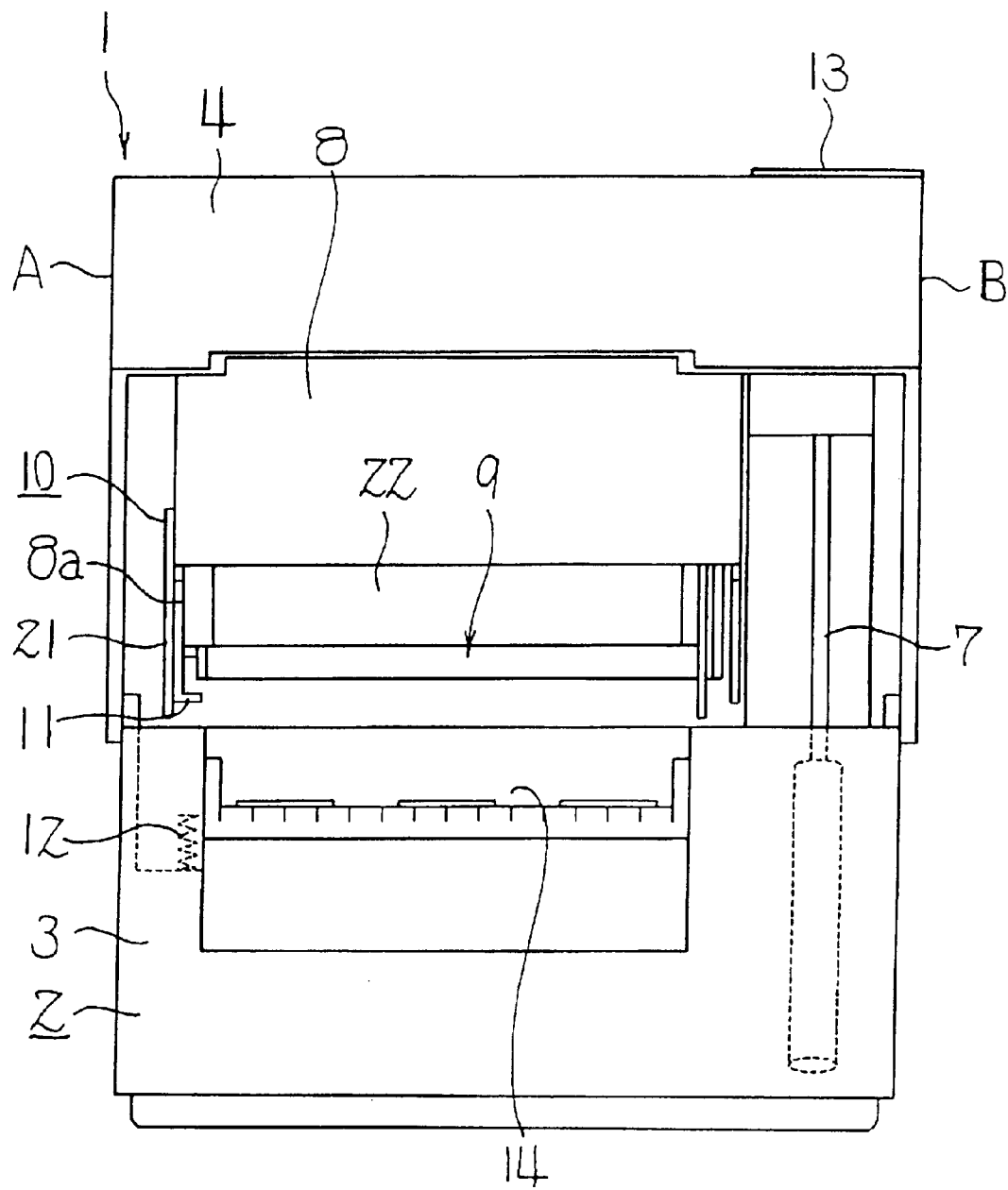
FIG. 2 is a left side elevation of the image forming apparatus, in its open state, according to the present invention.

FIG. 2 is a left side view of the copier 1, where the upper body 4 is shown to be in an open condition, with the gas damper 7 extended. In the present view, it is seen that the gas damper 7 is on the right side (i.e., side B as shown in FIG. 2) of FIG. 2, thus showing that the gas damper 7 is positioned at the rear of the copier 1 as opposed to a front side, side A. As will be discussed, many of the heavier components of the scanner in the upper part 4 are positioned over the gas damper 7.

An elastic material 12, such as a pressure coil spring is installed at the lower body 3 for assisting an operator during a closing operation of the upper body 4. In this view, the elastic material 12 is positioned symmetrically with respect to the gas damper 7, on an opposing side of a center portion of the copier 1. The elastic material 12 helps prevent the upper body 4 from slamming shut against the lower body 3. As seen, a support portion 11 is formed at the side frame 8a of the housing 8 in the upper body 4 and contacts the elastic material 12 when the upper body 4 is closed.

The housing 8 is made of a hard material so as to prevent warping of the upper body 4 during a closing operation. As seen in FIG. 2, a plate 13 is positioned on the top surface of the upper body 4, over the back right hand corner of the upper body 4. More particularly, the plate 13 may include an instruction such as "press here" so as to inform an operator where to push in order to close the upper body 4 with minimal effort and strain. In this way, a one-handed closing operation is possible with minimal effort on the part of the operator, and minimizing warpage of the upper body 4 and the scanning components included in the upper body 4. Having the single closure point is possible because the upper body 4, when in a fully opened position, is supported only by the gas damper 7 and the fulcrum 5. Also, as seen from this view, the paper feed path is formed in the gap between the upper body 4 and the lower body 3.

Figure 3:
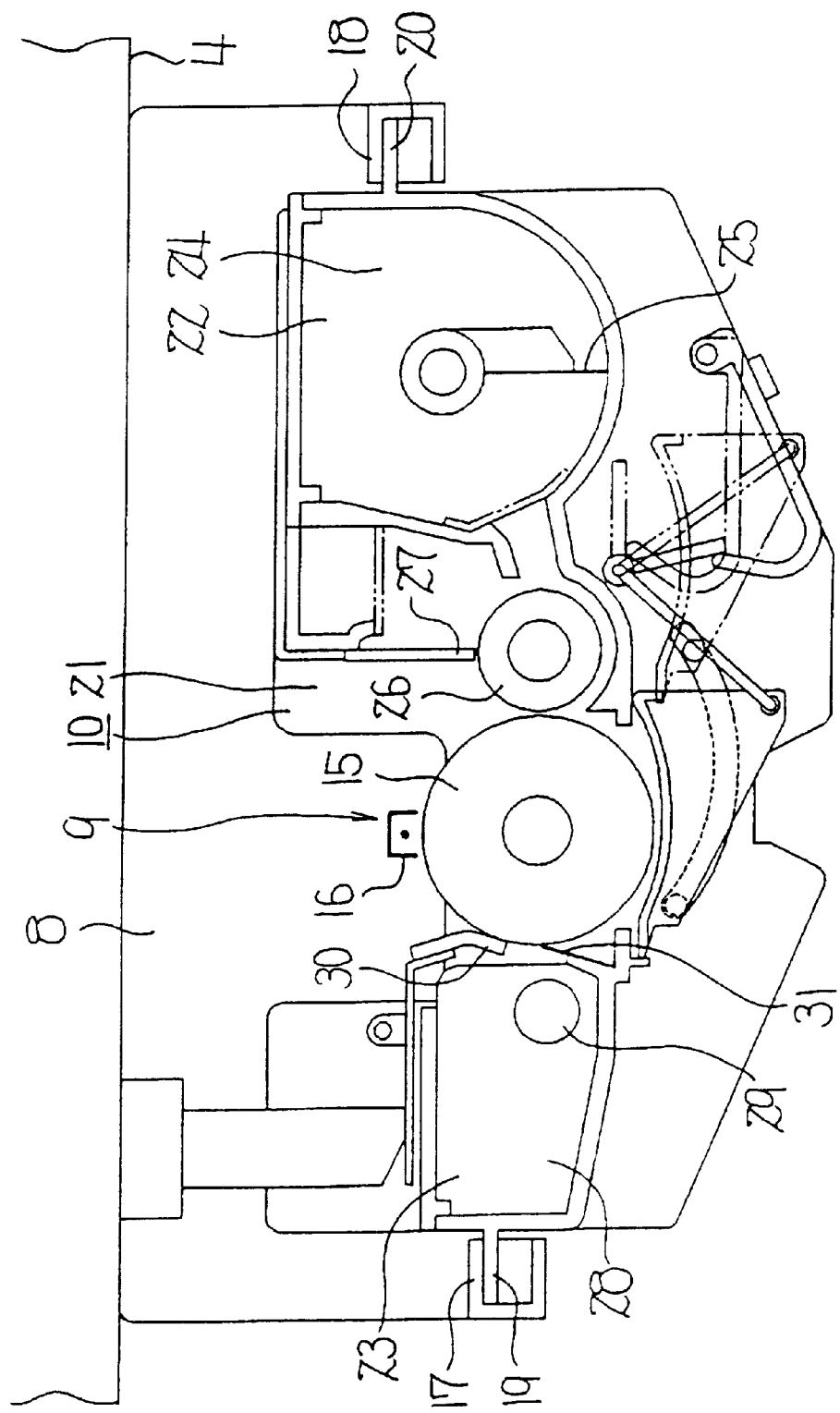
FIG. 3 is a vertical section of an image developing magazine, illustrating an installation condition of the image forming apparatus according to the present invention.

FIG. 3 shows the image developing magazine 10, where the image developing magazine 10 is installed in the housing 8 of the upper body 4. As shown, a drum 15 is installed in the housing 8 and is configured to rotate during an image forming operation. A charger 16 provides an electrical charge on the surface of the drum 15 where the latent image is later formed via an optical system that erases the charge according to a pattern of the image to be made. The image developing magazine 10 includes a pair of guide rails 17 and 18, as shown, which are respectively received in ribs 19 and 20, of a casing 21. The casing 21 is part of the image developing magazine 10, as is a developer 22 and cleaner 23, which respectively develop an image on the drum 15 and clean residual toner, or other image forming substance, from the drum 15 after the image has been transferred to a sheet.

The developer 22 includes a fresh toner tank 24 that holds fresh toner therein. An agitator 25 is disposed within the fresh toner tank 24 and rotates so as to agitate the toner within the fresh toner tank 24 and prevents the toner from clumping together. Toner that is dispensed from the fresh toner tank 24 is applied to a developing roller 26 during a developing operation. The developer collects on the developing roller 26, and is uniformly spread over the developing roller 26 by a toner blade 27 that adjusts the quantity of the attached toner on the developing roller 26.

The cleaner 23 has a waste toner tank 28, a toner collecting roller 29, a cleaning blade 30, and an elastic member 31. The cleaning blade 30 removes residual toner from the drum 15 after the image transfer operation has been completed. The waste toner tank 28 collects and stores the removed toner by way of the elastic member 31.

An image transfer charger (not shown) is disposed underneath the drum 15, in the lower body 3. The paper feeding path has a paper feeding roller (not shown) and an image fixing roller (not shown), disposed along the paper feeding path. The paper is initially fed between the upper body 4 and lower body 3 by the paper feeding roller, and the toner image is subsequently transferred to the paper, before being fixed by the image fixing roller. Moreover, after the electrostatic latent image is developed by the developer 22, so that a toner image is formed by the fresh toner on the surface of the drum 15, the toner image is transferred from the drum 15 to the paper by the image transfer charger. Subsequently, the toner image on the paper is fused by the heat and pressure from the image fixing roller, and thus fixed on to the paper. Generally, the image forming unit 9 includes the drum 15, the charger 16, and the developer 22.

All the units, including the scanner unit and image forming unit 9 are placed as close to the back side as possible, adjacent the gas damper 7, so as to position as much weight as practical at the back side. In this way, the heaviest portions of the scanner unit, including the guide member, motor M100 and power transfer member TM100 are positioned at the rear side of the unit, adjacent the damper 7. The platen, which is uniformly distributed across the top of the upper body 4, as a practical matter cannot be completely placed over the damper 7. However, the rigid structure of the upper part 4 helps to maintain the structure integrity of the upper part 4, even though the upper part 4 is only supported on the one side thereof when rotated up and away from the lower part 3 during a maintenance action. The guide member guides an optical image reader in a movable fashion and the motor and power transfer motor are for actuating the optical image reader. The drum 15, the developer roller 26, the agitator 25, and the toner collecting roller 29 are also powered by the motor.

The upper body 4 is made of a synthetic resin and has a metal inner frame. The metal frame is made by TOG process. The TOG process is one of the known manufacturing methods for combining metal materials by togging one metal to another metal. TIG (tungsten inert gas) welding is an alternative. There is only one damper, namely damper 7, positioned at the back side of the lower body 3, so that the opening space between the lower body 3 and the upper body 4 is wide enough for an operator to handle a paper jam or other kind of machine maintenance without obstruction by a second gas damper. The large gap enables the operator to open the upper body 4 and change the developer magazine 10 in an easy and convenient fashion. Because the heavier units are placed at the back side of the unit, near the damper 7, most of the scanner's weight is disposed over top of the damper 7. In this way, the tendency is avoided of having the upper body 4 from becoming contorted or warped at the front side thereof.

When closed, the upper body 4 is contacted by the elasticity material 12 at the front side so as to prevent the upper body 4 from slamming shut. The length of the elastic material is simply enough to avoid the upper body 4 from slamming shut, but limited so as to avoid extending over top of the lower body 3. Therefore, the elasticity material 12 does not extend into the open space created between the upper body 4 and lower body 3 when the upper body 4 is opened. Consequently, the operator has unobstructed access to the opening between the upper body 4 and the lower body 3 when maintenance action is required.

While the above description provides a full and complete disclosure of the preferred embodiments of the present invention, various modifications, alternate constructions, and equivalents may be employed without departing from the true spirit and scope of the invention. Therefore, the above description and illustrations should not be construed as limiting the scope of the invention, defined by the appended claims. The present document is based on Japanese Patent Application No. 09-242366, filed in Japan on Sep. 8, 1997, the entire contents of which is incorporated herein by reference.

Obviously, numerous modifications and variations of the present invention are possible in light of the above teachings. It is therefore to be understood that within the scope of the appended claims, the invention may be practiced otherwise than as specifically described herein.

We claim:

1. An image forming apparatus comprising:
   an upper body;
   a lower body;
   a fulcrum that pivotally connects the upper body to the lower body, such that the upper body pivots about said fulcrum when opened; and
   a damper having a first end connected to a backside of said lower body and another end positioned against said upper body and configured to press against said upper body when opened, wherein
      said upper body being supported at an opened end thereof only by said damper,
      said damper being contained in said upper body and said lower body when the upper body is closed on the lower body.

2. An image forming apparatus as claimed in claim 1, further comprising:
   an elasticity member positioned between said upper body and lower body and configured to slow a movement of said upper body when closing said upper body on said lower body.

3. An image forming apparatus, comprising:
   an upper body;
   a lower body;
   a fulcrum that pivotally connects the upper body to the lower body, such that the upper body pivots about said fulcrum when opened; and
   a damper having a first end connected to a backside of said lower body and another end positioned against said upper body and configured to press against said upper body when opened, wherein
      said upper body being supported at an opened end thereof only by said damper,
      said damper being contained in said upper body and said lower body when the upper body is closed on the lower body, wherein,
      said upper body includes a scanner unit configured to scan a document and output an image data, and
      the scanner unit being positioned at a back side of the upper body so as to concentrate a weight of said scanner unit at the back side of said upper body and overtop of where said damper presses against said upper body.

4. An image forming apparatus as claimed in claim 3, wherein:
   said scanner unit includes a motor and a power transfer device.

5. An image forming apparatus, comprising:
   an upper body;
   a lower body;
   a fulcrum that pivotally connects the upper body to the lower body, such that the upper body pivots about said fulcrum when opened; and
   a damper having a first end connected to a backside of said lower body and another end positioned against said upper body and configured to press against said upper body when opened, wherein
      said upper body being supported at an opened end thereof only by said damper,
      said damper being contained in said upper body and said lower body when the upper body is closed on the lower body, and further comprising,
         a closure position indicator positioned on said upper body and co-aligned with said damper, said closure position indicator configured to inform an operator where to push on said upper body so as to close said upper body using minimum force.

6. An image forming apparatus, comprising:

an upper body;

a lower body;

a fulcrum that pivotally connects the upper body to the lower body, such that the upper body pivots about said fulcrum when opened; and a damper having a first end connected to a backside of said lower body and another end positioned against said upper body and configured to press against said upper body when opened, wherein said upper body being supported at an opened end thereof only by said damper, said damper being contained in said upper body and said lower body when the upper body is closed on the lower body, wherein, said upper body includes a metal frame made by a welding process.

7. An image forming apparatus comprising:

an upper body;

a lower body;

means for pivoting the upper body about the lower body when opening the upper body;

means for pushing an end of the upper body away from said lower body during an entire moving path of said upper body during an opening operation; and means for dampening a motion of said upper body when closing said upper body, wherein, said means for pushing pushes said upper body at a single location, and is not used with a second means for pushing against said upper body at another location, said means for pushing and said means for dampening being within said upper body and said lower body when said upper body is closed on said lower body.

8. The image forming apparatus of claim 7, wherein:

said means for dampening comprises means for applying a resiliency force between said upper body and said lower body when closing said upper body against said lower body.

9. The image forming apparatus, comprising:

an upper body;

a lower body;

means for pivoting the upper body about the lower body when opening the upper body;

means for pushing an end of the upper body away from said lower body during an entire moving path of said upper body during an opening operation; and means for dampening a motion of said upper body when closing said upper body, wherein, said means for pushing pushes said upper body at a single location, and is not used with a second means for pushing against said upper body at another location, said means for pushing and said means for dampening being within said upper body and said lower body when said upper body is closed on said lower body, wherein, said upper body comprises means for scanning a document and producing image data, and means for distributing a weight of said means for scanning over the single location where the means for pushing pushes said upper body.

10. The image forming apparatus of claim 9, wherein:

said means for scanning includes a motor and a power transfer device.

11. The image forming apparatus, comprising:

an upper body;

a lower body;

means for pivoting the upper body about the lower body when opening the upper body;

means for pushing an end of the upper body away from said lower body during an entire moving path of said upper body during an opening operation; and means for dampening a motion of said upper body when closing said upper body, wherein, said means for pushing pushes said upper body at a single location, and is not used with a second means for pushing against said upper body at another location, said means for pushing and said means for dampening being within said upper body and said lower body when said upper body is closed on said lower body, and further comprising, means for indicating where an operator should push on said upper body so as to require a minimum force from said operator to close said upper body.

12. The image forming apparatus, comprising:

an upper body;

a lower body;

means for pivoting the upper body about the lower body when opening the upper body;

means for pushing an end of the upper body away from said lower body during an entire moving path of said upper body during an opening operation; and means for dampening a motion of said upper body when closing said upper body, wherein, said means for pushing pushes said upper body at a single location, and is not used with a second means for pushing against said upper body at another location, said means for pushing and said means for dampening being within said upper body and said lower body when said upper body is closed on said lower body, wherein, said upper body includes a metal frame made by a welding process.

* * * * *